(12) United States Patent
Dietrich et al.

(10) Patent No.: US 10,696,584 B1
(45) Date of Patent: Jun. 30, 2020

(54) COATED ARTICLE WITH LOW-E COATING HAVING PROTECTIVE CONTACT LAYER INCLUDING AG, NI, AND CR FOR PROTECTING SILVER BASED IR REFLECTING LAYER(S), AND METHOD OF MAKING SAME

(71) Applicant: Guardian Europe S.a.r.l., Bertrange (LU)

(72) Inventors: Anton Dietrich, Bertrange (LU); Bernd Disteldorf, Bertrange (LU)

(73) Assignee: Guardian Europe S.a.r.l., Bertrange (LU)

( * ) Notice: Subject to any disclaimer, the term of this patent is extended or adjusted under 35 U.S.C. 154(b) by 0 days.

(21) Appl. No.: 16/696,123

(22) Filed: Nov. 26, 2019

(51) Int. Cl.
  *B32B 15/04* (2006.01)
  *B32B 17/06* (2006.01)
  *C03C 17/36* (2006.01)

(52) U.S. Cl.
  CPC ............... *C03C 17/3644* (2013.01)

(58) Field of Classification Search
  USPC ........... 428/426, 432, 434, 688, 701, 702
  See application file for complete search history.

(56) References Cited

U.S. PATENT DOCUMENTS

| | | | |
|---|---|---|---|
| 5,344,718 A * | 9/1994 | Hartig | C03C 17/36 428/623 |
| 5,770,321 A | 6/1998 | Hartig et al. | |
| 5,800,933 A | 9/1998 | Hartig et al. | |
| 6,306,525 B1 * | 10/2001 | Schicht | C03C 17/36 359/359 |
| 6,524,714 B1 | 2/2003 | Neuman et al. | |
| 6,541,084 B2 | 4/2003 | Wang | |
| 6,576,349 B2 * | 6/2003 | Lingle | B32B 17/10009 428/426 |
| 6,802,943 B2 * | 10/2004 | Stachowiak | C03C 17/36 204/192.12 |
| 8,679,633 B2 * | 3/2014 | Imran | C03C 17/36 428/432 |
| 8,945,714 B2 | 2/2015 | Lao et al. | |
| 9,028,956 B2 | 5/2015 | Knoll et al. | |
| 9,028,983 B2 | 5/2015 | Imran et al. | |
| 9,371,684 B2 | 6/2016 | Butz et al. | |
| 9,518,319 B2 * | 12/2016 | Ding | C03C 17/3639 |
| 9,556,070 B2 | 1/2017 | Wuillaume et al. | |
| 10,138,158 B2 * | 11/2018 | Ding | C03C 17/3652 |
| 10,294,150 B2 | 5/2019 | Disteldorf et al. | |
| 10,301,215 B1 | 5/2019 | Xu et al. | |
| 2003/0150711 A1 | 8/2003 | Laird | |
| 2004/0043226 A1 * | 3/2004 | Laird | B32B 17/10036 428/432 |

(Continued)

*Primary Examiner* — Lauren R Colgan

(57) ABSTRACT

A coated article includes a low emissivity (low-E) coating supported by a glass substrate. The low-E coating includes at least one silver (Ag) based infrared (IR) reflecting layer(s) that is provided adjacent to and contacting at least one contact layer of or including Ag, Ni and Cr. The provision of a contact layer(s) including at least Ag, Ni and Cr, directly over and contacting a silver-based IR reflecting layer, has been found to advantageously increase visible transmission ($T_{vis}$) of the low-E coating. Such low-E coating may be used in applications such as monolithic windows, insulated glass (IG) window units, and the like.

50 Claims, 3 Drawing Sheets

(56) References Cited

U.S. PATENT DOCUMENTS

| | | | |
|---|---|---|---|
| 2007/0207327 A1* | 9/2007 | Glenn | C03C 17/36 428/450 |
| 2012/0219821 A1* | 8/2012 | Frank | C03C 17/36 428/630 |
| 2012/0225224 A1* | 9/2012 | Blacker | C03C 17/3618 428/34 |
| 2018/0251886 A1* | 9/2018 | Lu | C03C 17/36 |

* cited by examiner

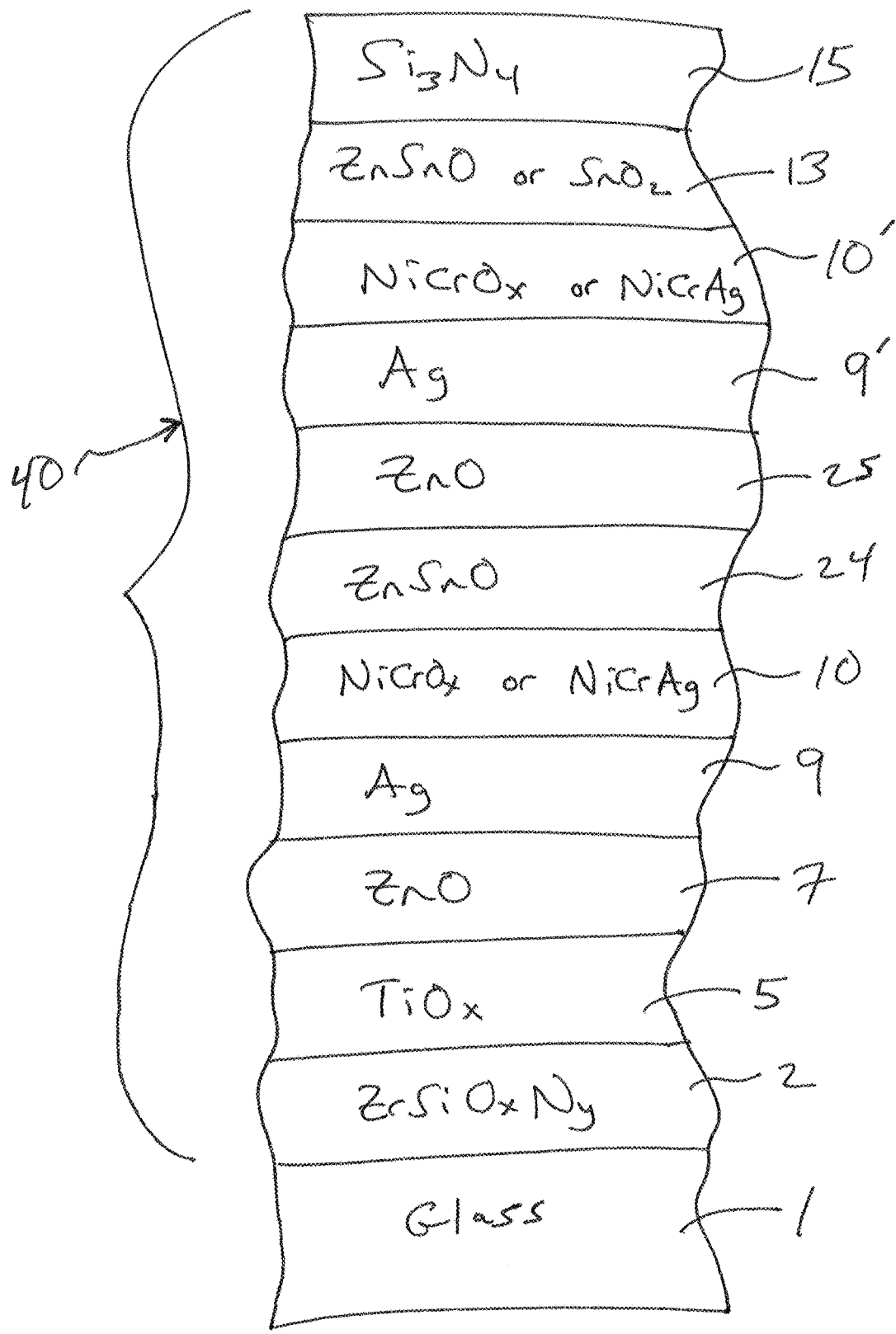

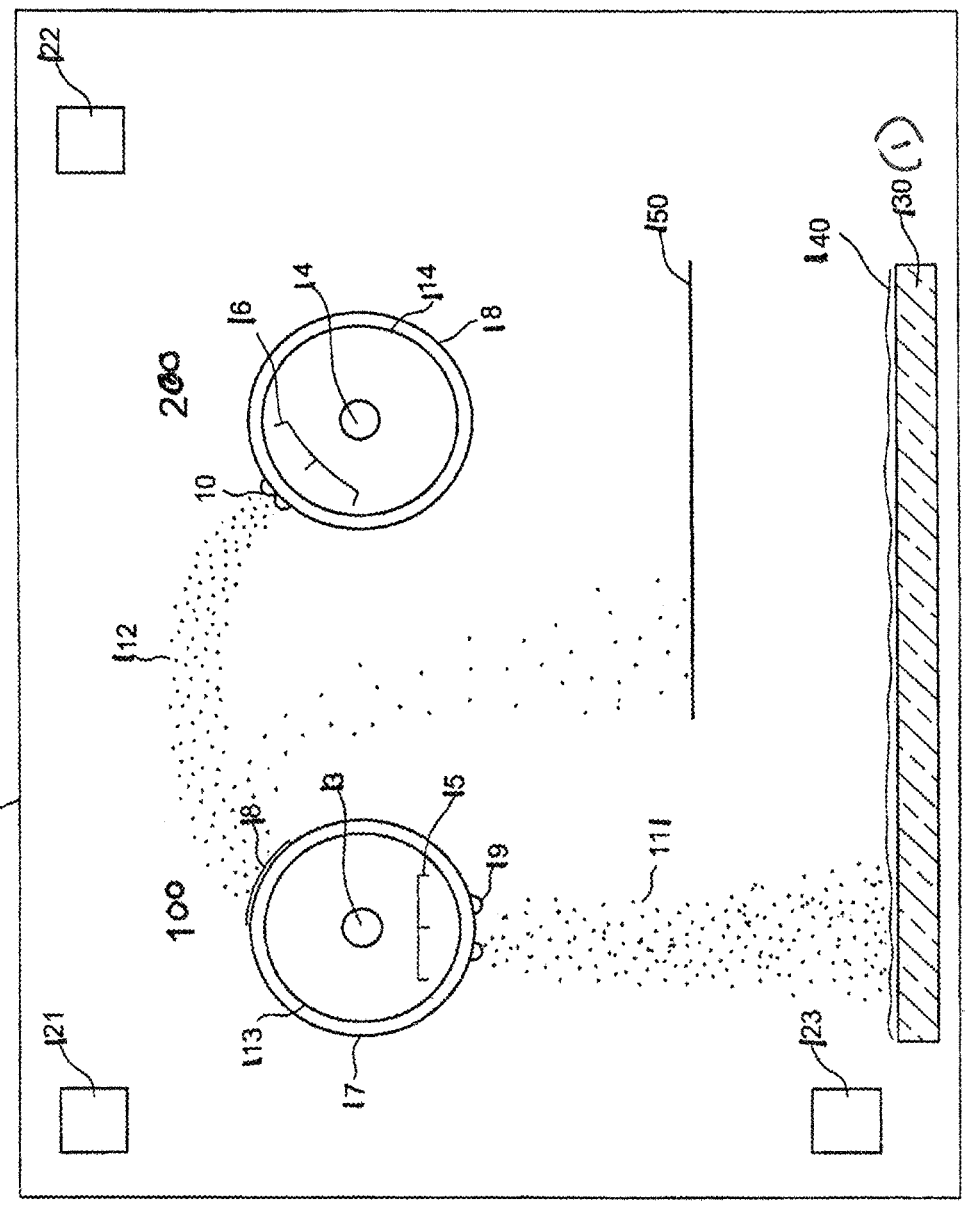

COATED ARTICLE WITH LOW-E COATING HAVING PROTECTIVE CONTACT LAYER INCLUDING AG, NI, AND CR FOR PROTECTING SILVER BASED IR REFLECTING LAYER(S), AND METHOD OF MAKING SAME

This application relates in certain example embodiments to a coated article including a coating comprising at least one silver (Ag) based infrared (IR) reflecting layer(s) that is provided adjacent to and contacting at least one contact layer of or including Ag, Ni and Cr. The provision of a contact layer(s) including at least Ag, Ni and Cr, directly over and contacting a silver-based IR reflecting layer, has been found to advantageously increase visible transmission ($T_{vis}$) of the low-E coating (compared to using a NiCr contact layer). The provision of the contact layer(s) including at least Ag, Ni and Cr, directly over and contacting a silver-based IR reflecting layer, has also been found to advantageously increase solar factor (SF) and/or light-to-solar gain ratio (LSG) of the low-E coating, while not sacrificing emissivity and/or sheet resistance. The silver based IR reflecting layer, and adjacent contact layer(s) including at least Ag, Ni and Cr, are part of a low emissivity (low-E) coating, and may be sandwiched between at least transparent dielectric layers. Such low-E coating may be used in applications such as monolithic windows, insulated glass (IG) window units, and the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, substantially neutral color, low emissivity (or emittance), low sheet resistance ($R_s$), low U-values in the context of IG window units, and/or low specific resistivity. High visible transmission and substantially neutral color may permit coated articles to be used in applications where these characteristics are desired such as in architectural or vehicle window applications, whereas low-emissivity (low-E), low sheet resistance, and low specific resistivity characteristics permit such coated articles to block significant amounts of IR radiation so as to reduce for example undesirable heating of vehicle or building interiors.

Low-E coatings having at least one silver based IR reflecting layer are known in the art. For example, see U.S. Pat. Nos. 5,344,718, 6,576,349, 8,945,714, 9,371,684, 9,028,956, 9,556,070, 8,945,714, 9,028,983, which are all hereby incorporated herein by reference. Low-E coatings on glass are widely used in commercial and residential buildings to save energy. The double Ag low-E coating is a dominant low-E product due to its excellent low emissivity properties and excellent control of solar heat gain. While there are some durable low-E coatings in the market, their performances are sometimes poor especially with respect to undesirably low light-to-solar gain ratio (LSG) values of around 1.0 or less, because it is often difficult to achieve high visible transmission ($T_{vis}$) along with other desirable features in a low-E coating. The higher the LSG value, the more energy saved, so that high LSG values are desirable. LSG is calculated as $T_{vis}$/SHGC, where SHGC is according to NRFC 2001.

Certain example embodiments relate to a coated article including a coating comprising at least one silver (Ag) based infrared (IR) reflecting layer(s) that is provided adjacent to and contacting at least one contact layer of or including Ag, Ni and Cr. It has surprisingly been found that the provision of a contact layer(s) including at least Ag, Ni and Cr, directly over and contacting a silver-based IR reflecting layer, has been found to advantageously increase visible transmission ($T_{vis}$) of the low-E coating (compared to using a NiCr contact layer). Adding Ag to a NiCr based contact layer, directly contacting silver, has been surprisingly and unexpectedly found to increase visible transmission of the coating without sacrificing performance such as sheet resistance and/or emissivity. The provision of the contact layer(s) including at least Ag, Ni and Cr, directly over and contacting a silver-based IR reflecting layer, has also been found to advantageously increase solar factor (SF) and/or light-to-solar gain ratio (LSG) of the low-E coating, while not sacrificing emissivity and/or sheet resistance. The contact layer(s) including at least Ag, Ni and Cr may or may not be oxidized, and is preferably a suboxide in certain example embodiments. The silver based IR reflecting layer, and adjacent contact layer(s) including at least Ag, Ni and Cr, are part of a low emissivity (low-E) coating, and may be sandwiched between at least transparent dielectric layers. Such low-E coating may be used in applications such as monolithic windows, insulated glass (IG) window units, and the like.

In an example embodiment of this invention, there is provided a coated article including a coating supported by a glass substrate, the coating comprising: a first dielectric layer on the glass substrate; an metallic or substantially metallic infrared (IR) reflecting layer comprising silver on the glass substrate located over at least the first dielectric layer; a protective contact layer comprising Ag, Ni and Cr on the glass substrate located over and directly contacting the IR reflecting layer comprising silver; a second dielectric layer on the glass substrate located over at least the first dielectric layer, the IR reflecting layer comprising silver, and the protective contact layer; wherein metal content of the protective contact layer comprising Ag, Ni and Cr comprises from about 5-40% Ag, from about 10-80% Ni, and from about 10-80% Cr (atomic %); and wherein the coating has a sheet resistance ($R_s$) of no greater than 11 ohms/square and a normal emissivity ($E_n$) of no greater than 0.2.

In an example embodiment of this invention, there is provided a method of making a coated article including a coating supported by a glass substrate, the method comprising: sputter depositing a first dielectric layer on the glass substrate; sputter depositing a metallic or substantially metallic infrared (IR) reflecting layer comprising silver on the glass substrate located over at least the first dielectric layer; sputter depositing a contact layer comprising Ag, Ni and Cr on the glass substrate located over and directly contacting the IR reflecting layer comprising silver; sputter depositing a second dielectric layer on the glass substrate located over at least the first dielectric layer, the IR reflecting layer comprising silver, and the contact layer; wherein metal content of the contact layer comprising Ag, Ni and Cr comprises from about 5-40% Ag, from about 10-80% Ni, and from about 10-80% Cr (atomic %); and wherein the coating has a sheet resistance ($R_s$) of no greater than 11 ohms/square and a normal emissivity ($E_n$) of no greater than 0.2.

The sputter depositing the contact layer comprising Ag, Ni and Cr may comprise simultaneously sputtering first and second rotating targets, the first target comprising Ag, and the second target comprising Ni and Cr. A magnet bar of the first target may be orientated in a different direction than is a magnet bar of the second target. The magnet bars are respectively oriented so that material to be deposited form the second target is sputtered toward the first target and lands of the first target. The first target may comprise Ag, and the second target may comprise Ni and Cr, for example, or vice versa.

In an example embodiment of this case, there is provided a method of making a coated article including a coating supported by a glass substrate, the method comprising: sputter depositing a first dielectric layer on the glass substrate; sputter depositing a metallic or substantially metallic infrared (IR) reflecting layer comprising silver on the glass substrate located over at least the first dielectric layer; sputter depositing a contact layer comprising Ag, Ni and Cr on the glass substrate located over and directly contacting the IR reflecting layer comprising silver; wherein said sputter depositing the contact layer comprising Ag, Ni and Cr comprises simultaneously sputtering first and second rotating targets, the first target comprising Ag, and the second target comprising Ni and Cr, wherein a magnet bar of the first target is orientated in a different direction than is a magnet bar of the second target so that material to be deposited form the second target is sputtered toward the first target and lands of the first target; and sputter depositing a second dielectric layer on the glass substrate located over at least the first dielectric layer, the IR reflecting layer comprising silver, and the contact layer.

BRIEF DESCRIPTION OF THE DRAWINGS

FIG. 2 is a cross sectional view of a coated article according to another example embodiment of this invention.

FIG. 3 is a schematic diagram of sputter-depositing a contact layer including Ag, Ni, and Cr according to an example embodiment of this invention.

DETAILED DESCRIPTION OF EXAMPLE EMBODIMENTS OF THE INVENTION

Figure 1:
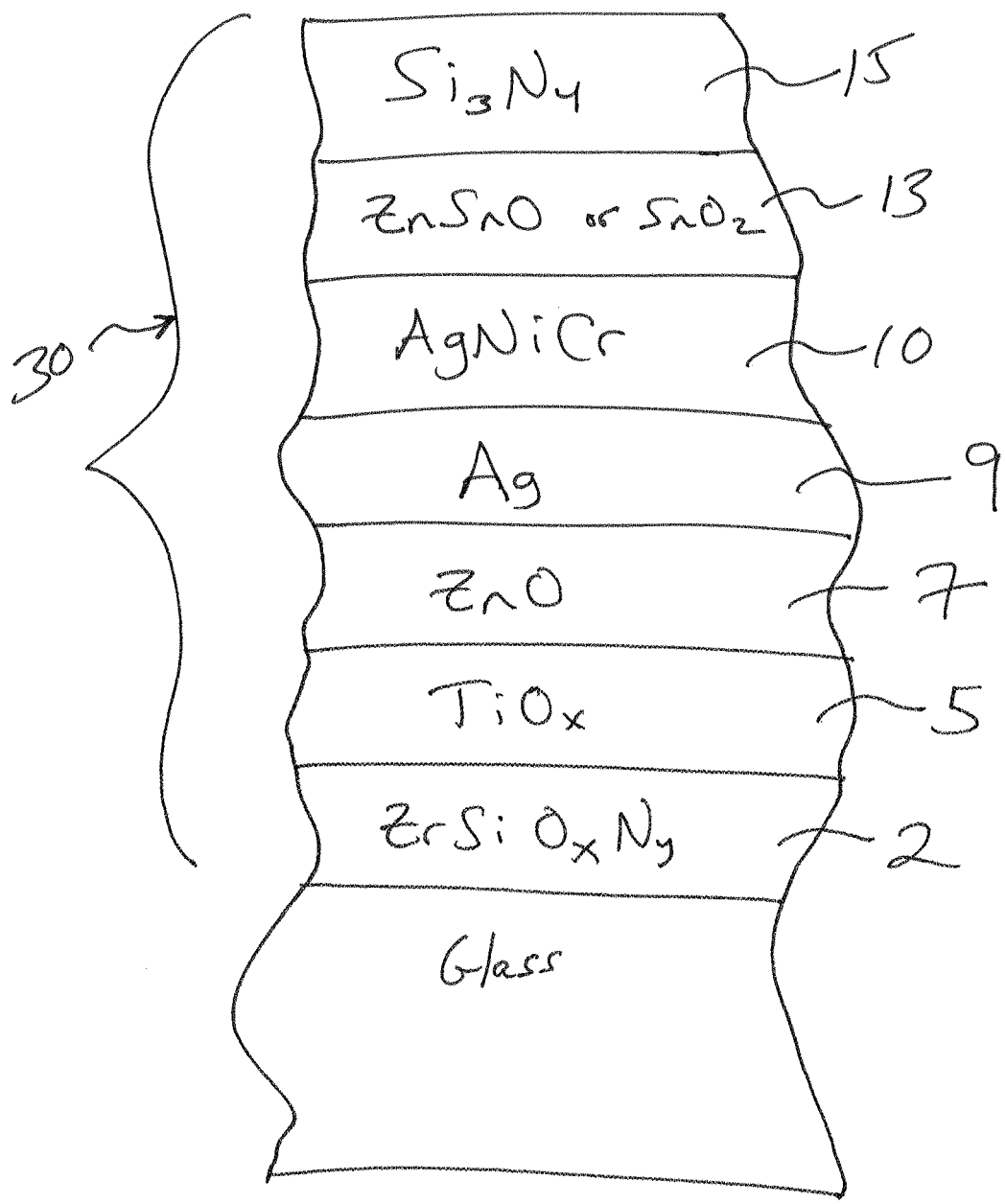
FIG. 1 is a cross sectional view of a coated article according to an example embodiment of this invention.

Referring now to the drawings in which like reference numerals indicate like parts throughout the several views.

Example embodiments of this invention relate to a coated article including a glass substrate 1 that supports a low-E coating 30, 40. The low-E coating 30, 40 is designed to have good silver durability (e.g., chemical durability) and desirably visible transmission, while preferably maintaining high SF and/or LSG values.

According to certain example embodiments, the low-E coating (e.g., 30 and/or 40) includes at least one silver (Ag) based infrared (IR) reflecting layer(s) 9, 9' that is provided adjacent to and contacting at least one contact layer 10, 10' of or including Ag, Ni and Cr. It has surprisingly been found that the provision of a contact layer(s) 10, 10' including at least Ag, Ni and Cr, directly over and contacting a silver-based IR reflecting layer 9, 9', advantageously increases visible transmission ($T_{vis}$) of the low-E coating (compared to using a NiCr contact layer). For example, experimental data has indicated that adding Ag to NiCr in the contact layer 10 (or 10') during the sputter-deposition process causes visible transmission of the overall coated article to increase by about 1-4% compared to if no Ag was added to the contact layer during the sputter-deposition process. In this respect, adding Ag to a NiCr based contact layer, directly contacting silver, has been surprisingly and unexpectedly found to increase visible transmission of the coating without sacrificing performance such as sheet resistance and/or emissivity. The provision of the contact layer(s) 10, 10' including at least Ag, Ni and Cr, directly over and contacting a silver-based IR reflecting layer 9, 9', has also been found to advantageously increase solar factor (SF) and/or light-to-solar gain ratio (LSG) of the low-E coating, while not sacrificing emissivity and/or sheet resistance. The contact layer(s) 10, 10' including at least Ag, Ni and Cr may or may not be oxided, and is preferably a suboxide in certain example embodiments. The silver based IR reflecting layer 9, 9', and adjacent contact layer(s) 10, 10' including at least Ag, Ni and Cr, are part of a low emissivity (low-E) coating 30, 40, and may be sandwiched between at least transparent dielectric layers such as 2, 5, 24, 25, 13 and/or 15. Such low-E coatings 30, 40 may be used in applications such as monolithic windows, insulated glass (IG) window units, and the like.

In certain example embodiments, protective contact layer 10 (or 10') is at least 40 angstroms (Å) thinner (more preferably at least 50 Å thinner, even more preferably at least 75 Å thinner, and most preferably at least 100 Å thinner) than the adjacent silver based IR reflecting layer 9 (or 9'). Such coated articles may be used in applications such as monolithic windows, insulated glass (IG) window units, and the like. Coated articles herein may optionally be heat treated (e.g., thermally tempered).

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer low-E coating (or layer system) 30 provided on the substrate 1 either directly or indirectly. As shown in FIG. 1, the low-E coating 30 is of or includes transparent dielectric layer 2 of or including silicon nitride (e.g., $Si_3N_4$, or some other suitable stoichiometry), silicon oxyntitride, zirconium silicon oxynitride, or other suitable material, metal oxide dielectric layer 5 of or including $TiO_x$ or other suitable material, zinc oxide inclusive transparent dielectric layer 7 (e.g., $ZnO_x$ where "x" may be about 1; or $ZnAlO_x$), metallic or substantially metallic IR (infrared) reflecting layer 9 of or including silver, protective contact layer 10 of or including Ag, Ni and Cr (which optionally may be oxided) provided directly on and contacting the silver IR reflecting layer 9, and an overcoat of or including tin oxide and/or zinc stannate inclusive transparent dielectric layer 13 and silicon nitride inclusive transparent dielectric layer 15. Any silicon nitride inclusive layers may further include Al, oxygen, or the like, and any tin oxide layer may likewise further include other materials such as nitrogen, zinc, or the like. Other layers and/or materials may also be provided in the coating in certain example embodiments of this invention, and it is also possible that certain layers may be removed or split in certain example instances. For example, a zirconium oxide overcoat layer (not shown) may be provided over layer 15 in certain example embodiments of this invention. Moreover, one or more of the layers discussed above may be doped with other materials in certain example embodiments of this invention.

FIG. 2 is a cross sectional view of a coated article according to another example embodiment of this invention. In contrast with FIG. 1, the low-E coating 40 of FIG. 2 contains two spaced apart silver based IR reflecting layers 9 and 9', which IR reflecting layers 9 and 9' in FIG. 2 are spaced apart by layers 10, 24 and 25. In both the FIG. 1 and FIG. 2 embodiments, the low-E coating includes at least one silver based IR reflecting layer (e.g., 9 and/or 9') provided adjacent to, under, and contacting a protective contact layer (e.g., 10 and/or 10') including Ag, Ni and Cr in order to protect the silver of the low-E coating. As explained herein, adding Ag to the NiCr of layer 10 and/or 10' surprisingly results in higher visible transmission, and higher SF and/or LSG of the coated article. In the FIG. 2 embodiment, one or both of contact layer(s) 10, 10' may be of or include Ag, Ni and Cr which may be oxidized.

The low-E coating 40 illustrated in FIG. 2 is supported by glass substrate 1 (e.g., clear, green, bronze, or blue-green glass substrate from about 1.0 to 10.0 mm thick (or any other suitable glass or other substrate thickness), more preferably from about 1.0 mm to 6.0 mm thick), and includes transparent dielectric layer 2 of or including silicon nitride, silicon oxynitride, zirconium silicon oxynitride, or other suitable material, transparent dielectric layer 5 of or including titanium oxide, zinc stannate or other suitable material, seed layer of or including zinc oxide or zinc stannate 7, metallic or substantially metallic lower silver based IR reflecting layer 9, contact layer 10 preferably of or including AgNiCr which may optionally be oxidized and/or slightly nitrided, transparent dielectric layer of or including zinc stannate 24 or other suitable material, transparent dielectric seed layer of or including zinc oxide or zinc stannate 25 or other suitable material, metallic or substantially metallic upper silver based IR reflecting layer 9', contact layer 10' preferably of or including AgNiCr which may optionally be oxidized and/or nitrided, transparent dielectric layer 13 of or including zinc stannate, zinc oxide, tin oxide, or the like, and transparent dielectric layer 15 of or including silicon nitride, silicon oxynitride, and/or other suitable material. The silicon nitride inclusive layer 15 may further include Al, oxygen, or the like. It is possible, in certain example embodiments, for one of layers 10, 10' to be of or including another material such as NiCr, $NiCrN_x$, NiCrMo, $NiCrMoO_x$, $NiCrMoN_x$, $NiTiNbO_x$, nickel (Ni) oxide, chromium/chrome (Cr) oxide, $TiO_x$, or a nickel alloy oxide such as nickel chrome oxide ($NiCrO_x$), or other suitable material. Other layers and/or materials may also be provided in the coating in certain example embodiments of this invention, and it is also possible that certain layers may be removed or split in certain example instances. For example, a zirconium oxide overcoat layer (not shown) may be provided over layer 15 in certain example embodiments of this invention. Moreover, one or more of the layers discussed above may be omitted from coating 40 or doped with other materials in certain example embodiments of this invention.

Upper contact layers 10 and 10' are preferably of or including AgNiCr in certain example embodiments of this invention. They may optionally be oxidized and/or nitrided. Also, they may be doped with other material(s) such as Fe or the like. Moreover, layer 10 of or including AgNiCr may be located at other positions in the coating 30 (or 40), namely positions other than shown in the figures, in certain other embodiments of this invention.

While FIGS. 1-2 illustrates using an upper contact layer (10, 10') in various example coatings, this invention is not limited to the coatings shown in FIGS. 1-2. For example, a contact layer 10 or 10' of or including Ag, Ni and Cr, which may optionally be oxidized and/or nitride, as discussed herein, may be used over a silver based IR reflecting layer in any other type of low-E coating, including but not limited to in any of the low-E coatings described in any of U.S. Pat. Nos. 5,344,718, 6,576,349, 8,945,714, 9,371,684, 9,028,956, 9,556,070, 8,945,714, 9,028,983, 10,294,150, and/or 10,301,215, which are all hereby incorporated herein by reference, or in any other suitable single silver, double silver, or triple silver type low-E coatings.

Note that "substantially" metallic means metallic with no more than 10% oxygen content, more preferably no more than 5% oxygen content, atomic %. For example, substantially metallic layers 9, 9' may contain from 0-10% oxygen and/or nitrogen, more preferably from 0-5% oxygen and/or nitrogen (atomic %), most preferably from 0-2% oxygen and/or nitrogen, in example embodiments of this invention.

In monolithic instances, the coated article includes only one substrate such as glass substrate 1 (see FIGS. 1-2). However, monolithic coated articles herein may be used in devices such as IG window units for example which include multiple glass substrates. Example IG window units are illustrated and described, for example, in U.S. Pat. Nos. 5,770,321, 5,800,933, 6,524,714, 6,541,084 and US 2003/0150711, the disclosures of which are all hereby incorporated herein by reference. An example IG window unit may include, for example, the coated glass substrate 1 shown in FIGS. 1-2 coupled to another glass substrate via spacer(s), sealant(s) or the like with a gap being defined therebetween. This gap between the substrates in IG unit embodiments may in certain instances be filled with a gas such as argon (Ar). An example IG unit may comprise a pair of spaced apart substantially clear glass substrates each about 3-4 mm thick one of which is coated with a coating herein in certain example instances, where the gap between the substrates may be from about 5 to 30 mm, more preferably from about 10 to 20 mm, and most preferably about 12-16 mm. In certain example instances, the coating may be provided on the side of the inner or outer glass substrate 1 facing the gap.

Silicon nitride inclusive transparent dielectric layer 2 is provided for antireflection purposes, and have been found to allow color shifts to be reduced. Silicon nitride layer 2 may be of or include $Si_3N_4$. Alternatively, the silicon nitride layer 2 may be of the Si-rich type (not fully stoichiometric). Moreover, one or both of the silicon nitride layers 2 and/or 15 may further include a dopant such as aluminum or stainless steel, and/or small amounts of oxygen. These layers may be deposited via sputtering in certain example embodiments, or via any other suitable technique. It is possible that other materials such as titanium oxide, zinc stannate, or tin oxide may be used for transparent dielectric layer(s) 2 and/or 15. The layer may include other material such as oxygen and/or Zr, as shown for example in FIGS. 1-2.

Transparent dielectric seed layer 7 is of or includes zinc oxide (e.g., ZnO) in the FIG. 1 and FIG. 2 embodiments. The zinc oxide of layer(s) 7 may contain other materials as well such as Al (e.g., to form $ZnAlO_x$) in certain example embodiments. For example, in certain example embodiments of this invention, zinc oxide layer 7 may be doped with from about 1 to 10% Al (or B), more preferably from about 1 to 5% Al (or B), and most preferably about 2 to 4% Al (or B). The use of zinc oxide 7 under the silver in layer 9 allows for an excellent quality of silver to be achieved. In certain example embodiments (e.g., to be discussed below) the zinc oxide inclusive layer 7 may be formed via sputtering a ceramic ZnO or metal rotatable magnetron sputtering target. It has been found that the use of the ceramic target in certain example embodiments (e.g., of ZnO, which may or may not be doped with Al, F or the like) allows for a high quality of silver to be provided thereby resulting in a lower emissivity coating. While the Zn:O in the ceramic target may be stoichiometric in certain example embodiments, at least one substoichiometric ceramic target comprising $ZnO_x$ (e.g., where $0.25 \le x \le 0.99$, more preferably $0.50 \le x \le 0.97$, and even more preferably 0.70≤x≤0.96) may instead be used in sputter-depositing a zinc oxide inclusive layer 7 which may be substoichiometric in certain instances. It is possible that other materials such as zinc stannate, NiCr, $NiCrN_x$, $NiCrMoN_x$, or $NiCrO_x$ may be used for layer 7 in alternative embodiments of this invention.

Still referring to FIGS. 1-2, transparent infrared (IR) reflecting layers 9 and 9' are preferably conductive and metallic or substantially metallic, and preferably comprise or consist essentially of silver (Ag). IR reflecting layers 9 and 9' are not doped with other metal(s) in preferred embodiments of this invention. IR reflecting layers 9 and 9' help allow the coating to have low-E and/or good solar control characteristics such as low emittance, low sheet resistance, and so forth. In certain example embodiments, silver (Ag) IR reflecting layers 9 and 9' are located over transparent dielectric zinc oxide inclusive seed layers 7, 25, and one or both of layer(s) 9, 9' are located under and directly contacting a silver doped proactive layer 10.

An example overcoat, such as shown in FIG. 1, may be of or include transparent dielectric layers 13 and/or 15 in certain example embodiments. Dielectric layer 13 may be of or include a metal oxide such as tin oxide in certain example embodiments of this invention. Metal oxide inclusive layer 13, such as tin oxide or zinc stannate, is provided for antireflection purposes, and also improves the emissivity of the coated article and the stability and efficiency of the manufacturing process. The tin oxide inclusive layer 13 may be doped with other materials such as nitrogen and/or zinc in certain example embodiments of this invention. The tin oxide based layer 13 provides good durability and improves light transmission. Dielectric layer 15 may be of or include silicon nitride (e.g., $Si_3N_4$ or other suitable stoichiometry) or any other suitable material in certain example embodiments of this invention such as silicon oxynitride. Silicon nitride layer 15 may further include other material, such as aluminum as a dopant or small amounts of oxygen in certain example embodiments of this invention. Optionally, other layers such as a zirconium oxide overcoat may be provided above layer 15 in the overcoat in certain example instances. Layer 15 is provided for durability purposes, and to protect the underlying layers. In certain example embodiments, silicon nitride based layer 15 may have an index of refraction (n) of from about 1.9 to 2.2, more preferably from about 1.95 to 2.05. In certain example embodiments, Zr may be provided in the silicon nitride of layer 15 (or layer 2 or layer 5). Thus, one or more of layers 2 and/or 15 may be of or include SiZrNx and/or zirconium oxide in certain example embodiments of this invention.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1 embodiment are as follows, from the glass substrate outwardly (e.g., the Al content in the zinc oxide layer and the silicon nitride layers may be from about 1-10%, more preferably from about 1-3% in certain example instances).

TABLE 1

(Example Materials/Thicknesses; FIG. 1 Embodiment)

| Layer | Preferred Range (Å) | More Preferred (Å) | Example (Å) |
|---|---|---|---|
| $Si_xN_y$ or SiZrON (layer 2) | 20-300 Å | 60-160 Å | 135 Å |
| TiOx (layer 5) | 10-200 Å | 35-120 Å | 40-90 Å |
| $ZnAlO_x$ (layer 7) | 10-200 Å | 35-120 Å | 40-90 Å |
| Ag (layer 9) | 40-170 Å | 60-155 Å | 80-145 Å |
| AgNiCr (layer 10) | 3-70 Å | 5-25 Å | 8-15 Å |
| ZnSnO or $SnO_2$ (layer 13) | 50-300 Å | 160-180 Å | 170 Å |
| $Si_xN_y$ or SiZrON (layer 15) | 100-800 Å | 150-600 Å | 500 Å |

While various thicknesses may be used in different embodiments of this invention, example thicknesses and materials for the respective layers on the glass substrate 1 in the FIG. 2 embodiment are as follows, from the glass substrate outwardly (e.g., the Al content in the zinc oxide layer and the silicon nitride layers may be from about 1-10%, more preferably from about 1-3% in certain example instances).

TABLE 2

(Example Materials/Thicknesses; FIG. 2 Embodiment)

| Layer | Preferred Range (Å) | More Preferred (Å) | Example (Å) |
|---|---|---|---|
| $Si_xN_y$ or SiZrON (layer 2) | 20-300 Å | 60-160 Å | 135 Å |
| TiOx (layer 5) | 10-200 Å | 35-120 Å | 40-90 Å |
| $ZnAlO_x$ (layer 7) | 10-200 Å | 30-120 Å | 40-90 Å |
| Ag (layer 9) | 40-170 Å | 60-155 Å | 80-145 Å |
| AgNiCr (layer 10) | 3-70 Å | 5-25 Å | 8-15 Å |
| $ZnSnO_x$ (layer 24) | 100-1100 Å | 500-900 Å | 745 Å |
| $ZnAlO_x$ (layer 25) | 10-200 Å | 30-120 Å | 40-90 Å |
| Ag (layer 9') | 40-170 Å | 60-155 Å | 80-145 Å |
| AgNiCr (layer 10') | 3-70 Å | 5-25 Å | 8-15 Å |
| $ZnSnO_x$ or $SnO_2$ (layer 13) | 40-400 Å | 50-200 Å | 80 Å |
| $Si_xN_y$ or SiZrON (layer 15) | 100-800 Å | 150-600 Å | 500 Å |

It has been surprisingly found that the presence of barrier layers 10, 10' of or including AgNiCr result in higher visible transmission, higher SF, higher LSG, and sufficiently protect durability of the underlying silver and coating.

In certain example embodiments of this invention, coated articles herein (e.g., see FIGS. 1-2) may have the following low-E (low emissivity), solar and/or optical characteristics set forth in Table 3 when measured monolithically, before and/or after any optional heat treatment such as thermal tempering.

TABLE 3

Low-E/Solar Characteristics (Monolithic; FIG. 1-2 Embodiments)

| Characteristic | General | More Preferred | Most Preferred |
|---|---|---|---|
| $R_s$ (ohms/sq.): | <=11.0 | <=10 | <=9 |
| $E_n$: | <=0.2 | <=0.15 | <=0.11 |
| $T_{vis}$ (%) | >=40 | >=50 | >=70 |
| LSG: | >=1.10 | >=1.20 | >=1.30 (or >= 1.60) |

Each AgNiCr based layer 10, 10' may be sputter-deposited in various manners. For example, each AgNiCr based layer 10, 10' may be sputter deposited from a single sputtering target of Ag, Ni and Cr in certain example embodiments of this invention.

However, in certain example embodiments of this invention, each AgNiCr based layer 10, 10' may be sputter deposited by co-sputtering a pair of targets including a NiCr target and an Ag target. For example, see FIG. 3 of the instant application where sputter depositing layer 10 (or layer 10') of or including Ag, Ni and Cr may comprises simultaneously sputtering first and second rotating targets 100 and 200, one of the targets (100 or 200) of or including Ag, and the second target (the other of 100, 200) of or including Ni and Cr. A magnet bar 15 of the first target 100 may be orientated in a different direction than is a magnet bar 16 of the second target 200. The magnet bars 15, 16 are respectively oriented so that material to be deposited form the second target 200 is sputtered toward the first target 100 and lands of the first target 100 as shown at 18. The first target 100 may be of Ag, and the second target 200 may be of or including NiCr, for example, or vice versa. A shield 150 may be provided between the second target 200 and the glass substrate 130 (or 1 in FIGS. 1-2), and the magnet bar 16 of the second target (e.g., comprising Ni and Cr) may be oriented so that Ni and Cr is sputtered upwardly from the second target 200 and toward and onto the first target 100 (e.g., comprising Ag) so as to land on the first target comprising Ag, as shown in FIG. 3 for example.

Briefly, sputter coating is an electric-discharge-type process which is conducted in a vacuum chamber in the presence of at least one gas (e.g., argon and/oxygen gas). Typically, a sputtering apparatus includes a vacuum chamber, a power source, an anode, and one or more cathode targets (see 100 and 200 in FIG. 3) which include material used to create a coating on an adjacent substrate (e.g., glass substrate or substrate of other material). The sputtering target (100, 200) may include an outer rotatable tube enclosing a magnet bar assembly (15, 16) including and an associated inner magnet bar support tube (13, 14). The magnet bar assembly (15, 16) may be secured to the support tube along substantially the entire length of the support tube for example. In certain example instances, the magnet bar may also include the support tube. While magnet "bars" are used in certain embodiments of this invention, this invention is not so limited and other types of magnets (other than "bars") may instead be used in the magnet assemblies of the targets.

When an electrical potential is applied to the cathode target (100, 200), the gas forms a plasma that bombards the sputtering target, thereby causing particles of the sputtering material from the target to leave the exterior surface of the target. These particles fall onto the substrate (e.g., glass substrate) to form a coating thereon. The outer target tube typically rotates about the stationary magnets which are supported by the inner support tube so that particles are "sputtered" substantially uniformly from the substantially the entire periphery of the target tube as it rotates past the fixed magnet bar(s). Co-sputtering of materials is an alternative to complex alloying of metallic materials in a single sputtering target. Dual C-MAG rotatable cylindrical magnetron sputtering targets can accomplish the co-sputtering of materials, e.g., by using two sputtering targets placed in relative proximity to one another in the apparatus (e.g., within a common chamber of the sputtering apparatus). The two target tubes may rotate through the plasma, which is substantially confined by the stationary magnet assemblies located inside of the target tubes. Two independently operated power supplies may be used in connection with a dual C-MAG apparatus for co-sputtering. The required ratio of materials may be adjusted by applying different power levels to the cathodes, and by applying appropriate shielding.

By modifying the position of at least one of the magnet bars (e.g., 16) in at least one of the two rotatable sputtering targets, a film 140 (layer 10 or layer 10') comprising material(s) from both targets (100 and 200) that is a more uniform mixture of composition can be formed. More particularly, in certain example embodiments of this invention, at least two rotatable sputtering targets (100, 200) are provided in a dual C-MAG apparatus in order to form layer 10 and/or layer 10' of or including AgNiCr. The magnet bar(s) 16 in the second target 200 may be moved to an angled position (e.g., directed toward the first target 100; e.g., see FIG. 3) thereby moving the plasma erosion zone 10 on the second target 200 for example to a location on the side of the second target 200 substantially facing or directed toward or near the first target 100. In such a manner, the second target 200 can be arranged to sputter a substantial portion (e.g., at least about 20%, more preferably at least about 30%, even more preferably at least about 40%, even more preferably at least about 50%, and possibly at least about 60%) of the target material that is sputtered therefrom at and/or onto the first target 100, rather than directly onto the substrate 130 (1). As the first target 100 rotates, the target material (e.g., NiCr) from the second target 200 will build up (e.g., substantially uniformly or otherwise) on the first target 100, along with the first target's own target material 17 (e.g., Ag). It is noted that either of the first or second target can be the modified target in different example embodiments, and in some further embodiments, both targets may be modified. In certain example embodiments, the first target 100, now coated with both its original target material 17 (e.g., Ag) and target material (e.g., NiCr) sputtered onto it from the second target 200, will in turn sputter deposit the target materials from both targets onto substrate (e.g., glass substrate) 130 (1) to form layer 10, 10' comprising a mixture of the different materials.

In certain example embodiments, which may be combined with any other embodiments herein, different magnetic field strengths may be applied to each of the targets respectively. For example and without limitation, using a stronger magnetic field on the second (modified) target 200 may restrict the plasma erosion zone 10 of the second target 200 to a narrower region, thus avoiding excessive material losses on the sputtering chamber's walls or onto the substrate directly. This arrangement may also, in certain example embodiments, allow a shorter distance between the two targets.

Accordingly, FIG. 3 shows a more direct deposition of target material 18 (e.g., NiCr via flux 112) from the second target 200 onto the first target 100. In the FIG. 3 embodiment, the magnet bars of the targets are oriented so that the plasma erosion zone 19 of the first target 100 (where the material is sputtered from) is arranged to face a first direction which is substantially toward the substrate (the first directly is substantially perpendicular to the substrate); and the plasma erosion zone 10 of the second target 200 is arranged to face a direction angled about 90-150 degrees from the first direction. Both targets shown in FIG. 3 may be rotating in the same direction during sputtering. As viewed in FIG. 3, the magnet bar 16 of target 200 may be oriented in a range from the 9 o'clock to 11 o'clock positions, and the magnet bar 15 of target 100 may be oriented in a range from the 4 o'clock to 8 o'clock positions. Optional shielding bar or plate 150 may be installed to block at least some material 18 from the second target 200 from falling from the second target 200 directly onto the substrate. The sputtering arrangement may or may not be used in a reactive sputtering process. In a reactive sputtering process, a reactive gas (e.g., oxygen) can be introduced either above or below the target tubes, at any or all of gas inlets 121, 122, and/or 123, possibly along with an inert gas such as argon, which may allow control of the composition of the resulting film 40 (10, 10') more precisely. There is at least one gas inlet (e.g., 121 and/or 122) above the target tubes and another (e.g., 123) below the shield 150, close to the substrate, to form two reaction zones.

The shielding (e.g., see 150) in combination with the top gas inlet (e.g., 121 and/or 122) and the tilted magnet bar 16 allows one to partially oxidize the material 112 which is deposited on the target tube 100. It allows to separate the reaction zones and thus reach reactive material compositions, which are not possible or unstable in a traditional configurations. Thus, these structures are particularly advantageous with respect to sputtering depositing example embodiments of this invention.

Probably we just should define that there is a gas inlet above the tubes and another below the shield, close to the substrate to form two reaction zones. This allows to keep the reactive oxygen containing zone away from the silver layer to be overcoated The Ag layer otherwise is easily degraded by the presence of oxygen due to oxidation.

In an example embodiment of this invention, there is provided a coated article including a coating supported by a glass substrate, the coating comprising: a first dielectric layer on the glass substrate; an metallic or substantially metallic infrared (IR) reflecting layer comprising silver on the glass substrate located over at least the first dielectric layer; a protective contact layer comprising Ag, Ni and Cr on the glass substrate located over and directly contacting the IR reflecting layer comprising silver; a second dielectric layer on the glass substrate located over at least the first dielectric layer, the IR reflecting layer comprising silver, and the protective contact layer; wherein metal content of the protective contact layer comprising Ag, Ni and Cr comprises from about 5-40% Ag, from about 10-80% Ni, and from about 10-80% Cr (atomic %); and wherein the coating has a sheet resistance ($R_s$) of no greater than 11 ohms/square and a normal emissivity ($E_n$) of no greater than 0.2.

In the coated article of the immediately preceding paragraph, metal content of the protective contact layer comprising Ag, Ni and Cr may comprise from about 10-40% Ag, from about 20-50% Ni, and from about 20-50% Cr (atomic %), more preferably from about 20-40% Ag, from about 20-40% Ni, and from about 20-40% Cr (atomic %).

In the coated article of any of the preceding two paragraphs, the IR reflecting layer may comprise, consist essentially of, or consist of, silver.

In the coated article of any of the preceding three paragraphs, the IR reflecting layer may be metallic or substantially metallic.

In the coated article of any of the preceding four paragraphs, the protective contact layer comprising Ag, Ni and Cr may comprises from about 0-30% oxygen (atomic %), more preferably from about 10-30% oxygen (atomic %), more preferably from about 10-25% oxygen, with an example being about 15-20% oxygen.

In the coated article of any of the preceding five paragraphs, the coated article may have a visible transmission of at least 40%, more preferably of at least 50%, and most preferably of at least 70%.

In the coated article of any of the preceding six paragraphs, the coated article may have a light-to-solar gain ratio (LSG) of at least 1.10, more preferably of at least 1.20, and most preferably of at least 1.30.

In the coated article of any of the preceding seven paragraphs, the coated article may or may not be thermally tempered.

In the coated article of any of the preceding eight paragraphs, the contact layer comprising Ag, Ni and Cr may be at least 40 Å thinner than is the IR reflecting layer comprising silver, more preferably at least 75 Å thinner than is the IR reflecting layer comprising silver, and sometimes at least 100 Å thinner than is the IR reflecting layer comprising silver.

In the coated article of any of the preceding nine paragraphs, the contact layer comprising Ag, Ni and Cr may be from about 3-70 Å thick, and the IR reflecting layer comprising silver may be from about 40-170 Å thick.

In the coated article of any of the preceding ten paragraphs, the contact layer comprising Ag, Ni and Cr may be from about 5-25 Å thick, and the IR reflecting layer comprising silver may be from about 60-155 Å thick.

In the coated article of any of the preceding eleven paragraphs, the contact layer comprising Ag, Ni and Cr may be from about 8-15 Å thick, and the IR reflecting layer comprising silver may be from about 80-145 Å thick.

In the coated article of any of the preceding twelve paragraphs, the first dielectric layer may be of or include silicon nitride.

In the coated article of any of the preceding thirteen paragraphs, the coating may have a sheet resistance ($R_S$) of no greater than 9 ohms/square and/or a normal emissivity ($E_n$) of no greater than 0.11.

In the coated article of any of the preceding fourteen paragraphs, the coating may further comprise another infrared (IR) reflecting layer comprising silver that is spaced apart from and does not contact the contact layer comprising Ag, Ni and Cr, and another contact layer comprising Ag, Ni and Cr that is located directly over and contacting the another infrared (IR) reflecting layer comprising silver. Metal content of the another contact layer comprising Ag, Ni and Cr may comprise from about 5-40% Ag, from about 10-80% Ni, and from about 10-80% Cr (atomic %).

In the coated article of any of the preceding fifteen paragraphs, the coating may further comprise a dielectric layer comprising zinc oxide located under and directly contacting the IR reflecting layer comprising silver.

In the coated article of any of the preceding sixteen paragraphs, the protective contact layer comprising Ag, Ni and Cr may be Ag-graded so as to include more Ag in an area thereof closer to the IR reflecting layer comprising silver and less Ag in an area thereof farther from the IR reflecting layer comprising silver; and/or the protective contact layer comprising Ag, Ni and Cr may be NiCr-graded so as to include more Ni and Cr in an area thereof farther from the IR reflecting layer comprising silver and less Ni and Cr in an area thereof closer to the IR reflecting layer comprising silver.

In the coated article of any of the preceding seventeen paragraphs, the protective contact layer comprising Ag, Ni and Cr may be located between and directly contacting the IR reflecting layer comprising silver and another dielectric layer. The another dielectric layer may comprise metal oxide such as an oxide of Sn and/or Zn.

In an example embodiment of this invention, there is provided a method of making a coated article including a coating supported by a glass substrate, the method comprising: sputter depositing a first dielectric layer on the glass substrate; sputter depositing a metallic or substantially metallic infrared (IR) reflecting layer comprising silver on the glass substrate located over at least the first dielectric layer; sputter depositing a contact layer comprising Ag, Ni and Cr on the glass substrate located over and directly contacting the IR reflecting layer comprising silver; sputter depositing a second dielectric layer on the glass substrate located over at least the first dielectric layer, the IR reflecting layer comprising silver, and the contact layer; wherein metal content of the contact layer comprising Ag, Ni and Cr comprises from about 5-40% Ag, from about 10-80% Ni, and from about 10-80% Cr (atomic %); and wherein the coating has a sheet resistance ($R_s$) of no greater than 11 ohms/square and a normal emissivity ($E_n$) of no greater than 0.2.

In the method of the immediately preceding paragraph, metal content of the contact layer comprising Ag, Ni and Cr may comprise from about 10-40% Ag, from about 20-50% Ni, and from about 20-50% Cr (atomic %), more preferably from about 20-40% Ag, from about 20-40% Ni, and from about 20-40% Cr (atomic %).

In the method of any of the preceding two paragraphs, the contact layer comprising Ag, Ni and Cr may be sputter deposited in an atmosphere including oxygen gas and comprises from about 10-30% oxygen (atomic %).

In the method of any of the preceding three paragraphs, the coated article may have a visible transmission of at least 50%, more preferably of at least 70%.

In the method of any of the preceding four paragraphs, the contact layer comprising Ag, Ni and Cr may be sputter-deposited to as to be Ag-graded so as to include more Ag in an area thereof closer to the IR reflecting layer comprising silver and less Ag in an area thereof farther from the IR reflecting layer comprising silver; and/or the contact layer comprising Ag, Ni and Cr may be sputter-depositing so as to be NiCr-graded so as to include more Ni and Cr in an area thereof farther from the IR reflecting layer comprising silver and less Ni and Cr in an area thereof closer to the IR reflecting layer comprising silver.

In the method of any of the preceding five paragraphs, said sputter depositing the contact layer comprising Ag, Ni and Cr may comprise simultaneously sputtering first and second rotating targets, the first target comprising Ag, and the second target comprising Ni and Cr. A magnet bar of the first target may be orientated in a different direction than is a magnet bar of the second target. The magnet bars are respectively oriented so that material to be deposited form the second target is sputtered toward the first target and lands of the first target. The first target may comprise Ag, and the second target may comprise Ni and Cr, for example, or vice versa.

In the method of any of the preceding six paragraphs, there may be a shield between the second target and the glass substrate, and the magnet bar of the second target (e.g., comprising Ni and Cr) may be oriented so that Ni and Cr is sputtered upwardly from the second target and toward the first target comprising Ag so as to land on the first target comprising Ag.

In an example embodiment of this case, there is provided a method of making a coated article including a coating supported by a glass substrate, the method comprising: sputter depositing a first dielectric layer on the glass substrate; sputter depositing a metallic or substantially metallic infrared (IR) reflecting layer comprising silver on the glass substrate located over at least the first dielectric layer; sputter depositing a contact layer comprising Ag, Ni and Cr on the glass substrate located over and directly contacting the IR reflecting layer comprising silver; wherein said sputter depositing the contact layer comprising Ag, Ni and Cr comprises simultaneously sputtering first and second rotating targets, the first target comprising Ag, and the second target comprising Ni and Cr, wherein a magnet bar of the first target is orientated in a different direction than is a magnet bar of the second target so that material to be deposited form the second target is sputtered toward the first target and lands of the first target; and sputter depositing a second dielectric layer on the glass substrate located over at least the first dielectric layer, the IR reflecting layer comprising silver, and the contact layer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   a first dielectric layer on the glass substrate;
   an metallic or substantially metallic infrared (IR) reflecting layer comprising silver on the glass substrate located over at least the first dielectric layer;
   a protective contact layer comprising Ag, Ni and Cr on the glass substrate located over and directly contacting the IR reflecting layer comprising silver;
   a second dielectric layer on the glass substrate located over at least the first dielectric layer, the IR reflecting layer comprising silver, and the protective contact layer;
   wherein metal content of the protective contact layer comprising Ag, Ni and Cr comprises from about 5-40% Ag, from about 10-80% Ni, and from about 10-80% Cr (atomic %); and
   wherein the coating has a sheet resistance ($R_s$) of no greater than 11 ohms/square and a normal emissivity ($E_n$) of no greater than 0.2.

2. The coated article of claim 1, wherein metal content of the protective contact layer comprising Ag, Ni and Cr comprises from about 10-40% Ag, from about 20-50% Ni, and from about 20-50% Cr (atomic %).

3. The coated article of claim 1, wherein metal content of the protective contact layer comprising Ag, Ni and Cr comprises from about 20-40% Ag, from about 20-40% Ni, and from about 20-40% Cr (atomic %).

4. The coated article of claim 1, wherein the IR reflecting layer consists essentially of silver.

5. The coated article of claim 1, wherein the IR reflecting layer is metallic.

6. The coated article of claim 1, wherein the protective contact layer comprising Ag, Ni and Cr comprises from about 0-30% oxygen (atomic %).

7. The coated article of claim 1, wherein the protective contact layer comprising Ag, Ni and Cr comprises from about 10-30% oxygen (atomic %).

8. The coated article of claim 1, wherein the protective contact layer comprising Ag, Ni and Cr comprises from about 10-25% oxygen (atomic %).

9. The coated article of claim 1, wherein the coated article has a visible transmission of at least 40%.

10. The coated article of claim 1, wherein the coated article has a visible transmission of at least 50%.

11. The coated article of claim 1, wherein the coated article has a visible transmission of at least 70%.

12. The coated article of claim 1, wherein the coated article has a light-to-solar gain ratio (LSG) of at least 1.10.

13. The coated article of claim 1, wherein the coated article has a light-to-solar gain ratio (LSG) of at least 1.30.

14. The coated article of claim 1, wherein the coated article is thermally tempered.

15. The coated article of claim 1, wherein the contact layer comprising Ag, Ni and Cr is at least 40 Å thinner than is the IR reflecting layer comprising silver.

16. The coated article of claim 1, wherein the contact layer comprising Ag, Ni and Cr is at least 75 Å thinner than is the IR reflecting layer comprising silver.

17. The coated article of claim 1, wherein the contact layer comprising Ag, Ni and Cr is at least 100 Å thinner than is the IR reflecting layer comprising silver.

18. The coated article of claim 1, wherein the contact layer comprising Ag, Ni and Cr is from about 3-70 Å thick, and the IR reflecting layer comprising silver is from about 40-170 Å thick.

19. The coated article of claim 1, wherein the contact layer comprising Ag, Ni and Cr is from about 5-25 Å thick, and the IR reflecting layer comprising silver is from about 60-155 Å thick.

20. The coated article of claim 1, wherein the contact layer comprising Ag, Ni and Cr is from about 8-15 Å thick, and the IR reflecting layer comprising silver is from about 80-145 Å thick.

21. The coated article of claim 1, wherein the first dielectric layer comprises silicon nitride.

22. The coated article of claim 1, wherein the coating has a sheet resistance ($R_s$) of no greater than 9 ohms/square and a normal emissivity ($E_n$) of no greater than 0.11.

23. The coated article of claim 1, wherein the coating further comprises another infrared (IR) reflecting layer comprising silver that is spaced apart from and does not contact the contact layer comprising Ag, Ni and Cr.

24. The coated article of claim 23, wherein the coating further comprises another contact layer comprising Ag, Ni and Cr that is located directly over and contacting the another infrared (IR) reflecting layer comprising silver.

25. The coated article of claim 23, wherein metal content of the another contact layer comprising Ag, Ni and Cr comprises from about 5-40% Ag, from about 10-80% Ni, and from about 10-80% Cr (atomic %).

26. The coated article of claim 1, wherein the coating further comprises a dielectric layer comprising zinc oxide located under and directly contacting the IR reflecting layer comprising silver.

27. The coated article of claim 1, wherein the protective contact layer comprising Ag, Ni and Cr is Ag-graded so as to include more Ag in an area thereof closer to the IR reflecting layer comprising silver and less Ag in an area thereof farther from the IR reflecting layer comprising silver.

28. The coated article of claim 1, wherein the protective contact layer comprising Ag, Ni and Cr is NiCr-graded so as to include more Ni and Cr in an area thereof farther from the IR reflecting layer comprising silver and less Ni and Cr in an area thereof closer to the IR reflecting layer comprising silver.

29. The coated article of claim 1, wherein the protective contact layer comprising Ag, Ni and Cr is located between and directly contacting the IR reflecting layer comprising silver and another dielectric layer.

30. The coated article of claim 29, wherein the another dielectric layer comprises metal oxide.

31. The coated article of claim 29, wherein the another dielectric layer comprises an oxide of Sn and/or Zn.

32. A method of making a coated article including a coating supported by a glass substrate, the method comprising:
   sputter depositing a first dielectric layer on the glass substrate;
   sputter depositing a metallic or substantially metallic infrared (IR) reflecting layer comprising silver on the glass substrate located over at least the first dielectric layer;
   sputter depositing a contact layer comprising Ag, Ni and Cr on the glass substrate located over and directly contacting the IR reflecting layer comprising silver;
   sputter depositing a second dielectric layer on the glass substrate located over at least the first dielectric layer, the IR reflecting layer comprising silver, and the contact layer;
   wherein metal content of the contact layer comprising Ag, Ni and Cr comprises from about 5-40% Ag, from about 10-80% Ni, and from about 10-80% Cr (atomic %); and
   wherein the coating has a sheet resistance ($R_s$) of no greater than 11 ohms/square and a normal emissivity ($E_n$) of no greater than 0.2.

33. The method of claim 32, wherein metal content of the contact layer comprising Ag, Ni and Cr comprises from about 10-40% Ag, from about 20-50% Ni, and from about 20-50% Cr (atomic %).

34. The method of claim 32, wherein metal content of the contact layer comprising Ag, Ni and Cr comprises from about 20-40% Ag, from about 20-40% Ni, and from about 20-40% Cr (atomic %).

35. The method of claim 32, wherein the contact layer comprising Ag, Ni and Cr is sputter deposited in an atmosphere including oxygen gas and comprises from about 10-30% oxygen (atomic %).

36. The method of claim 32, wherein the coated article has a visible transmission of at least 50%.

37. The method of claim 32, wherein the coated article has a visible transmission of at least 70%.

38. The method of claim 32, wherein the contact layer comprising Ag, Ni and Cr is sputter-deposited to as to be Ag-graded so as to include more Ag in an area thereof closer to the IR reflecting layer comprising silver and less Ag in an area thereof farther from the IR reflecting layer comprising silver.

39. The method of claim 32, wherein the contact layer comprising Ag, Ni and Cr is sputter-depositing so as to be NiCr-graded so as to include more Ni and Cr in an area thereof farther from the IR reflecting layer comprising silver and less Ni and Cr in an area thereof closer to the IR reflecting layer comprising silver.

40. The method of claim 32, wherein said sputter depositing the contact layer comprising Ag, Ni and Cr comprises simultaneously sputtering first and second rotating targets, the first target comprising Ag, and the second target comprising Ni and Cr.

41. The method of claim 40, wherein a magnet bar of the first target is orientated in a different direction than is a magnet bar of the second target.

42. The method of claim 41, wherein the magnet bars are respectively oriented so that material to be deposited form the second target is sputtered toward the first target and lands of the first target.

43. The method of claim 42, wherein the first target comprises Ag, and the second target comprises Ni and Cr.

44. The method of claim 43, further comprising a shield between the second target and the glass substrate, and wherein the magnet bar of the second target comprising Ni and Cr is oriented so that Ni and Cr is sputtered upwardly from the second target and toward the first target comprising Ag so as to land on the first target comprising Ag.

45. A coated article including a coating supported by a glass substrate, the coating comprising:
- a first dielectric layer on the glass substrate;
- a first infrared (IR) reflecting layer comprising silver on the glass substrate located over at least the first dielectric layer;
- a layer comprising Ag, Ni and Cr;
- a second IR reflecting layer comprising silver on the glass substrate over at least the first IR reflecting layer and the layer comprising Ag, Ni and Cr;
- wherein the layer comprising Ag, Ni and Cr is located between at least the first and second IR reflecting layers;
- wherein metal content of the layer comprising Ag and Cr comprises from about 5-40% Ag, from about 10-80% Ni, and from about 10-80% Cr (atomic %); and
- wherein the coating has a sheet resistance ($R_s$) of no greater than 11 ohms/square and a normal emissivity ($E_n$) of no greater than 0.2.

46. The coated article of claim 45, wherein metal content of the layer comprising Ag, Ni and Cr comprises from about 10-40% Ag, from about 20-50% Ni, and from about 20-50% Cr (atomic %).

47. The coated article of claim 45, wherein metal content of the layer comprising Ag, Ni and Cr comprises from about 20-40% Ag, from about 20-40% Ni, and from about 20-40% Cr (atomic %).

48. The coated article of claim 45, wherein the layer comprising Ag, Ni and Cr comprises from about 0-30% oxygen and/or nitrogen (atomic %).

49. The coated article of claim 45, wherein the layer comprising Ag, Ni and Cr directly contacts the first IR reflecting layer.

50. The coated article of claim 45, wherein the first dielectric layer comprises metal oxide.

* * * * *